United States Patent [19]
Winston

[11] Patent Number: 5,394,509
[45] Date of Patent: Feb. 28, 1995

[54] DATA PROCESSING SYSTEM AND METHOD FOR SEARCHING FOR IMPROVED RESULTS FROM A PROCESS

[76] Inventor: Patrick H. Winston, 88 Monument St., Concord, Mass. 01742

[21] Appl. No.: 861,068

[22] Filed: Mar. 31, 1992

[51] Int. Cl.$^6$ .......................................... G06F 15/18
[52] U.S. Cl. ...................................................... 395/13
[58] Field of Search ........................................ 395/13

[56] References Cited

U.S. PATENT DOCUMENTS

| | | | |
|---|---|---|---|
| 4,697,242 | 9/1987 | Holland et al. | 395/13 |
| 4,935,877 | 6/1990 | Koaz | 395/13 |
| 4,961,152 | 10/1990 | Davis | 395/13 |
| 5,048,095 | 9/1991 | Bhanu et al. | 395/13 |
| 5,136,686 | 8/1992 | Koza | 395/13 |
| 5,140,530 | 8/1992 | Guha et al. | 395/13 |
| 5,148,513 | 9/1992 | Koza et al. | 395/13 |
| 5,222,192 | 6/1993 | Shaefer | 395/13 |

OTHER PUBLICATIONS

Kohonen, Teuvo. Content Addressable Memories. (Berlin: Springer-Verlag, 1987), pp. 19–27.
E. I. Chang et al., "Using Genetic Algorithms to Select and Create Features for Pattern Classification", Int'l Joint Conf. on Neural Networks, 17–21, Jun. 1990.
D. E. Goldberg, "Genetic Algorithms in Search, Optimization, and Machine Learning", Addison–Wesley, 1989, pp. 10–14, 94–102.
M. Gordon, "Probabilistic and Genetic Algorithms For Document Retrieval", Communications of the ACM, vol. 31, No. 10, Oct. 1988, pp. 1208–1218.
Use of a Genetic Algoithm for Economic Optimization of a Manufacturing System; Tenga et al; Simulators V 1988 (The Society for Computer Simulation; 18–21 Apr. 1988; pp. 282–287.
An Incremental Genetic Algorithm for Real–Time Optimization; Fogarty; Proc. of IEEE Int. Conf. on Systems,. Man, and Cybernetics; vol. 1; 14–17 Nov. 1989; pp. 321–326.

*Primary Examiner*—Allen R. MacDonald
*Assistant Examiner*—Robert W. Downs
*Attorney, Agent, or Firm*—Wolf, Greenfield & Sacks

[57] ABSTRACT

A data processing system and method for searching for improved results from the process utilizes genetic learning and optimization processes. The process is controlled according to a trial set of parameters. Trial sets are selected on the basis of an overall ranking based on results of the process as performed with a trial set. The ranking may be based on quality, or on a combination of rankings based on both quality and diversity. The data processing system and method are applicable to manufacturing processes, database search processes, and the design of products.

54 Claims, 7 Drawing Sheets

DATA PROCESSING SYSTEM AND METHOD FOR SEARCHING FOR IMPROVED RESULTS FROM A PROCESS

FIELD OF THE INVENTION

The present invention is related to data processing systems and methods which assist in selection of parameters which control a process for the purpose of improving results obtained from the process. For example, the invention is related to selection of process parameters in a manufacturing process to improve the quantity or a quality of a product made by the process. The present invention is also related to database search methods and database systems for improving a prediction that an item in a database satisfies a predetermined selection criterion. The present invention is also related to design optimization processes. The data processing system and method of the present invention utilizes genetic learning and optimization processes.

BACKGROUND OF THE INVENTION

A common problem faced in optimizing a process is the selection of appropriate sets of variable parameters for controlling the process, and the development of new sets to try on the basis of results obtained. For example, a product made by a manufacturing process may have a complicated dependence on various controllable factors such as temperatures, pressures, flow rates, and the like. In order to improve or to optimize the result of such a process, the process may be performed with a number of sets of values for such controllable factors until a product of sufficient or apparent maximum quality is obtained.

A database search involves similar problems. In this type of process, optimization methods may be used to improve a prediction as to whether an item in a database may satisfy some selected criterion. An item may include a number of characteristics. A search is performed using a number of sets of test characteristics, which are varied until a sufficient number of items which match the test set satisfy the selected criterion. Those which do not match the test set should not satisfy the selected criterion.

The range of possible results of a process combined with the range of possible parameters is known as the search space of the process. A difficult problem related to optimization methods is overcoming local maxima in the search space. This problem is related to the selection and generation of trial sets of parameters for the process. For instance, most optimization methods are "hill-climbing" methods which use small variations in the process parameters of known sets of parameters to generate new trial sets for each time the process is performed. When a local maximum is reached, a less than optimal result is obtained with such small variations to the process parameters on subsequent attempts. Thus, a local maximum may appear to be the optimal result, when, in fact, other maxima may exist. In an attempt to overcome this problem, most optimization or "hill-climbing" methods avoid known or discovered local maxima. Some methods are not capable of overcoming local maxima. Others may overcome local maxima, but require extensive experimentation and trials and often take an unacceptable length of time.

One method for optimization is known as a genetic learning process. This process is so named because it involves steps for selecting and generating additional trial sets of parameters which steps are similar to those known as mutation and crossover (for generation) and "survival of the fittest" (for selection) in genetics.

Figure 1:
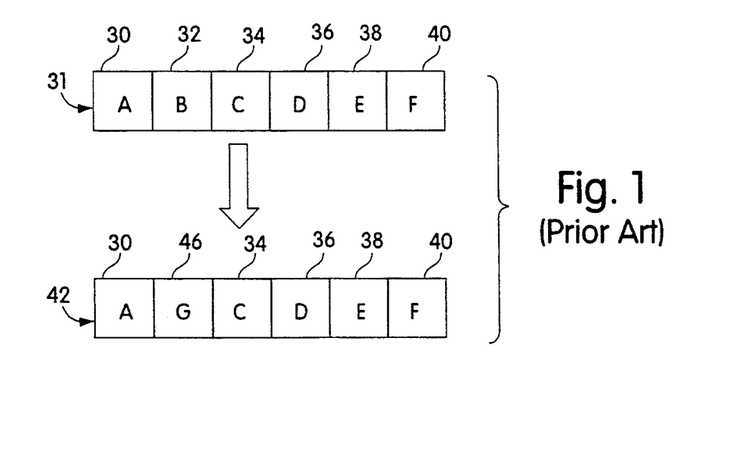
FIG. 1 is a graphical illustration of mutation of a trial set.
Figure 2:
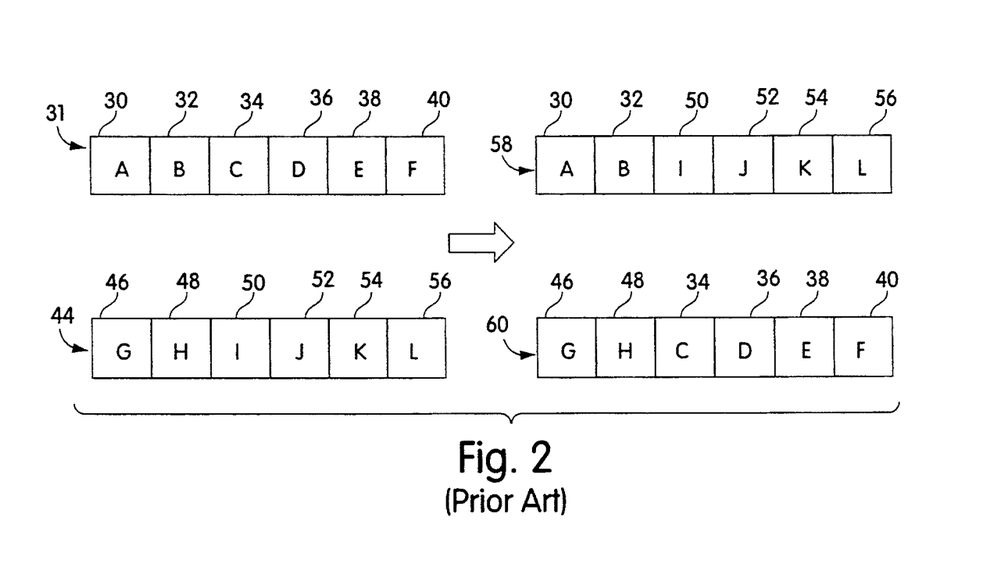
FIG. 2 is a graphical illustration of crossover of two trial sets.

The processes for set generation are illustrated graphically in FIGS. 1 and 2. FIG. 1 illustrates an example of mutation of a set. A set 31 includes six process parameters 30, 32, 34, 36, 38 and 40 for a process. A value (e.g. "A") is provided for each parameter (e.g., 30). An additional set is generated by changing (mutating) at least one of the parameters of set 31. In this example, parameters 32 and 40 have been changed. By the process of mutation, for each mutated set, one additional set is obtained.

FIG. 2 illustrates crossing (or crossover) between two sets. In this example, set 31 is crossed with another set 44 containing process parameters 46, 48, 50, 52, 54 and 56. Each set contains different values for the same process parameters. With crossover, two additional sets 58 and 60 are generated by mixing the values for the parameters of the crossed sets.

Selection of trial sets for analysis typically is based on the quality of the result of the process based on a given trial set. Trial sets whose results are of low quality typically are ignored or rejected in the selection process. In genetic processes in particular, selection of a trial set is based on the principle of "survival of the fittest" where fitness is determined by the quality of the result of the process when performed according to the trial set. Thus, those trial sets whose product is of low quality have a low fitness and typically are expressly rejected.

An example of the determination of fitness for selection will now be provided in connection with Table I. In this example, each trial set (a through e) is represented by an ordered pair of numbers. This representation will be relevant in connection with the detailed description of the present invention below. For each trial set, a quality of the result of the process was determined. Next, a value representing its fitness was determined according to a formula known as the "Standard Fitness". This formula (equation 1) sets the fitness $f_i$ of a set i based on its quality $q_i$ and the sum of all quality values $q_j$ for all j sets.

$$f_i = \frac{q_i}{\sum_j q_j} \quad (1)$$

TABLE I

| Trial Set | Quality ($q_i$) | ($f_i$) Standard Fitness |
| --- | --- | --- |
| A (1, 4) | 4 | 0.4 |
| B (3, 1) | 3 | 0.3 |
| C (1, 2) | 2 | 0.2 |
| D (1, 1) | 1 | 0.1 |
| E (7, 5) | 0 | 0 |

The fitness ($f_i$) of a trial set is defined as the probability that the trial set will be selected for further analysis. That is, a trial set is selected probablistically according to the standard fitness for further analysis (i.e., generation of additional sets by mutation or crossover and performance of the process according to the additional sets).

This method of selection allows little flexibility in influencing selection of trial sets because selection is based on only one criterion and because items of quality zero are expressly rejected. Furthermore, these genetic learning processes have been of merely academic interest and have not as yet been successfully applied to solving problems of commercial interest.

Accordingly, it is an object of the present invention to provide a data processing system and method for searching for improved selection of process parameters which allows more flexibility in influencing selection of trial sets.

It is another object of the invention to apply genetic learning processes to the optimization of manufacturing processes.

It is another object of the invention to apply genetic learning processes to the improvement of product designs.

It is another object of the invention to apply genetic learning processes to database search problems.

SUMMARY OF THE INVENTION

To achieve the foregoing and other objects of the invention, there is provided a data processing system and method, for searching for improved results from a process which is performed according to a set of parameters. A plurality of trial sets of parameters for the process is provided for analysis. The process is performed to obtain a result for each trial set provided for analysis for which a result has not yet been obtained. A subset of the trial sets is selected for further analysis on the basis of an overall ranking based on a selected criterion, such as quality, or a combination of quality and diversity. The number of sets should be at least the number of known local maxima. At least one of the selected sets is then perturbed (i.e., at least one of the parameters is changed) to generate at least one additional trial set. All sets may be perturbed. Duplicate trial sets should be eliminated. The process is performed again for the additional trial sets.

The overall ranking may be based on a ranking of trial sets on the basis of the quality of the results obtained from the process for the trial sets. The ranking may also be based on a measure of diversity of the trial sets.

This method may be used, for example, in connection with a manufacturing process, the results of which are a product. It may also be used in connection with a data processing system, such as a database system, for searching for improved prediction that a set of items in the database is likely to satisfy a predetermined selection criterion. In this method, the database is searched for sets which match the trial sets. It is then determined whether any matched sets satisfy the selection criterion and whether any unmatched sets satisfy the selection criterion. This method may also be used for optimizing the design of a product.

The steps of this method may be repeated until a selected termination criterion is satisfied. This termination criterion may be a small rate of change in the improvement of results. It may also be that a result of sufficient quality is obtained.

The ranking of trial sets on the basis of diversity can be performed using different methods. Each method assumes that there is at least one selected trial set and a number of remaining trial sets. The first method includes determining the distances between each remaining trial set and each already selected trial set. That is, for each remaining trial set, a distance from each of these selected trial sets is calculated; these distances are then summed. The remaining trial sets are then ranked according to these sums. In a second method for ranking by diversity, a distance between each parameter of a remaining trial set and a corresponding parameter of a selected trial set is determined. A ranking of the remaining trial sets for each parameter is determined. The determined ranks are summed and an overall diversity ranking is determined from this sum.

Diversity among trial sets may be measured using a variety of well-known distance metrics. Each distance metric has advantages and disadvantages according to the search space of the optimization problem.

The selection of sets for further analysis on the basis of both quality and diversity ranking is therefore influenced by the quality of the products obtained, the relative quality among trial sets, and the relative diversity of the trial sets. It may be further influenced by a probablistic selection, where the overall ranking merely influences a probability that a trial set will be selected. Probabilities may be assigned such that, for each trial set having a rank i, a probability $F_i$ is assigned to the trial set according to the function $F_i = (1 - F_{i-1})P$. P is the probability assigned to the trial set which has the highest overall rank. Other formulas may also be used. These probabilities, or the overall ranking, may also be used to determine what trial sets are to be mutated and which ones are to be crossed over.

By basing selection of trial sets on rank, implicit biases, introduced by unfortunate choices of quality measurement scale, may be eliminated.

DETAILED DESCRIPTION

The detailed description below should be read in conjunction with the accompanying drawing in which like reference numerals indicate like structures and method steps. The simple examples included in the description are intended merely to be illustrative. The system and method described are intended to be applicable to complex commercial systems such as manufacturing processes and database systems.

The process of selection of trial sets in connection with the present invention will now be described in general terms, in conjunction with a simple illustrative example. In the following examples, each trial set A-E is also represented by an ordered pair. These ordered pairs have been selected arbitrarily for the purpose of illustration and for comparison to the prior art example of Table I. It is assumed that each item in the ordered pair represents a value for a given process parameter which may be represented by a number taken from a possible range of numeric values to represent that process parameter (refer to Table II).

The selection of trial sets in connection with the present invention is based on a ranking of trial sets, and not merely a measure of quality. This ranking may be based solely on quality, or may be based on a combination of a quality rank and a rank based on diversity. From this ranking a fitness is determined which guides the process of selection.

Table II illustrates how trial sets are ranked, and how a fitness is determined for each trial set. Recall that fitness is the probability that the trial set will be selected for further analysis. In this example, it is also assumed that the given process has been performed according to each of the given trial sets A-E, and a quality of the result has been determined. These trial sets A-E are ranked according to the determined quality. A fitness for each trial set was then determined according to the following formula:

$$f_i = (1 - f_{i-1})P \qquad (2)$$

in which $f_i$ is the fitness of a trial set of rank I, and where P is a constant. In the example of Table II, P is selected to be 0.667. The trial set (A) of rank 1 is assigned a fitness $F_1 = P$.

TABLE II

| Trial Set | Quality (Range = 0 to 9) | Quality Rank | Rank Fitness ($f_i$) |
|---|---|---|---|
| A (1, 4) | 4 | 1 | 0.667 |
| B (3, 1) | 3 | 2 | 0.222 |
| C (1, 2) | 2 | 3 | 0.074 |
| D (1, 1) | 1 | 4 | 0.025 |
| E (7, 5) | 0 | 5 | 0.012 |

Table III is used to illustrate the principle of the diversity ranking of the trial sets A-E with respect to a trial set (5,1), according to the following formula:

$$D_i = \sum_k \frac{1}{d_k^2} \qquad (3)$$

where i is a given trial set, k is the number of selected trial sets, and d is the Euclidean distance between the given trial set and a selected trial set.

The diversity measure given above is only one of many possible diversity measures which may be used. The selection of a diversity measure is typically based on the search space, if it is known, in order to improve the accuracy of the diversity measure. Most diversity measures require that the measured items relate to a range of numerical values. Some process parameters may appear to be non-numeric, but could be translated into non-numeric values. For examples, colors (red, green, etc.) could be converted to light wavelengths. Addresses could be converted to map coordinates. Diversity between non-numeric sets could be measured according to a Hamming distance. Hamming and Euclidean distance, along with other well-known diversity measures are described in *Content Addressable Memories*, second edition, by Teuvo Kohonen (Berlin: Springer-Verlag, 1987), pp. 19-27, the contents of which are hereby incorporated by reference.

Many variations of these distance metrics may also be used, as would be apparent to those of ordinary skill in this art. For example, the formula above (equation 3) is the inverse squared Euclidean distance. A Euclidean distance could also be used.

TABLE III

| Trial Set | Quality | Diversity | Diversity Rank |
|---|---|---|---|
| A (1, 4) | 4 | 0.040 | 1 |
| B (3, 1) | 3 | 0.250 | 5 |
| C (1, 2) | 2 | 0.059 | 3 |
| D (1, 1) | 1 | 0.062 | 4 |
| E (7, 5) | 0 | 0.050 | 2 |

In Table III, a diversity between each trial set and the set (5,1) has been determined and presented in the diversity column. The item having the lowest diversity value (trial set with diversity =0.040) receives a diversity ranking of 1. Diversity rankings typically are unrelated to quality and quality rankings.

Table IV combines the diversity rank and quality rank of the trial sets from Tables II and III to obtain a rank sum. The trial sets are ranked according to the rank sum, to obtain an overall rank. In this instance, ties are broken according to diversity rank. Ties could also be broken by quality rank if so desired. Using the overall rank, a rank/diversity fitness may be determined using the same formula as used for the rank fitness as described above.

TABLE IV

| Trial Set | Rank Sum | Overall Rank | Rank/ Diversity Fitness |
|---|---|---|---|
| A (1, 4) | 2 | 1 | 0.667 |
| B (3, 1) | 7 | 4 | 0.025 |
| C (1, 2) | 6 | 2 | 0.222 |
| D (1, 1) | 8 | 5 | 0.012 |
| E (7, 5) | 7 | 3 | 0.074 |

Using diversity as a measure of fitness provides a different perspective on what may be done with local maxima in a search space, when taken in combination with genetic processes such as mutation and crossover. Selection of trial sets to be crossed over may be performed on the basis of quality and diversity. Thus, this process of selection would suggest that many high quality and greatly diverse trial sets are preferable. The result is that known local maxima in the search space should be populated rather than avoided, in contrast to other hill climbing or optimization methods.

TABLE V

| Trial Set | Standard Fitness | Rank Fitness | Rank/ Diversity Fitness |
|---|---|---|---|
| A (1, 4) | 0.4 | 0.667 | 0.667 |
| B (3, 1) | 0.3 | 0.222 | 0.025 |
| C (1, 2) | 0.2 | 0.074 | 0.222 |
| D (1, 1) | 0.1 | 0.025 | 0.012 |
| E (7, 5) | 0 | 0.012 | 0.074 |

A comparison of standard fitness, rank fitness and rank/diversity fitness may be made with the assistance of Table V. Table V lists, for each trial set, its standard fitness, rank fitness and rank/diversity fitness. A significant difference may be observed with trial sets B and E. Trial set E, according to a standard fitness, had a fitness of 0. However, its rank diversity fitness is 0.074. Trial set B, on the other hand, had a standard fitness of 0.3, whereas its rank/diversity fitness is 0.025. Thus, the probability that a trial set would be selected (i.e. survived to the next generation) may be significantly changed by using a rank/diversity fitness criteria.

Figure 3:
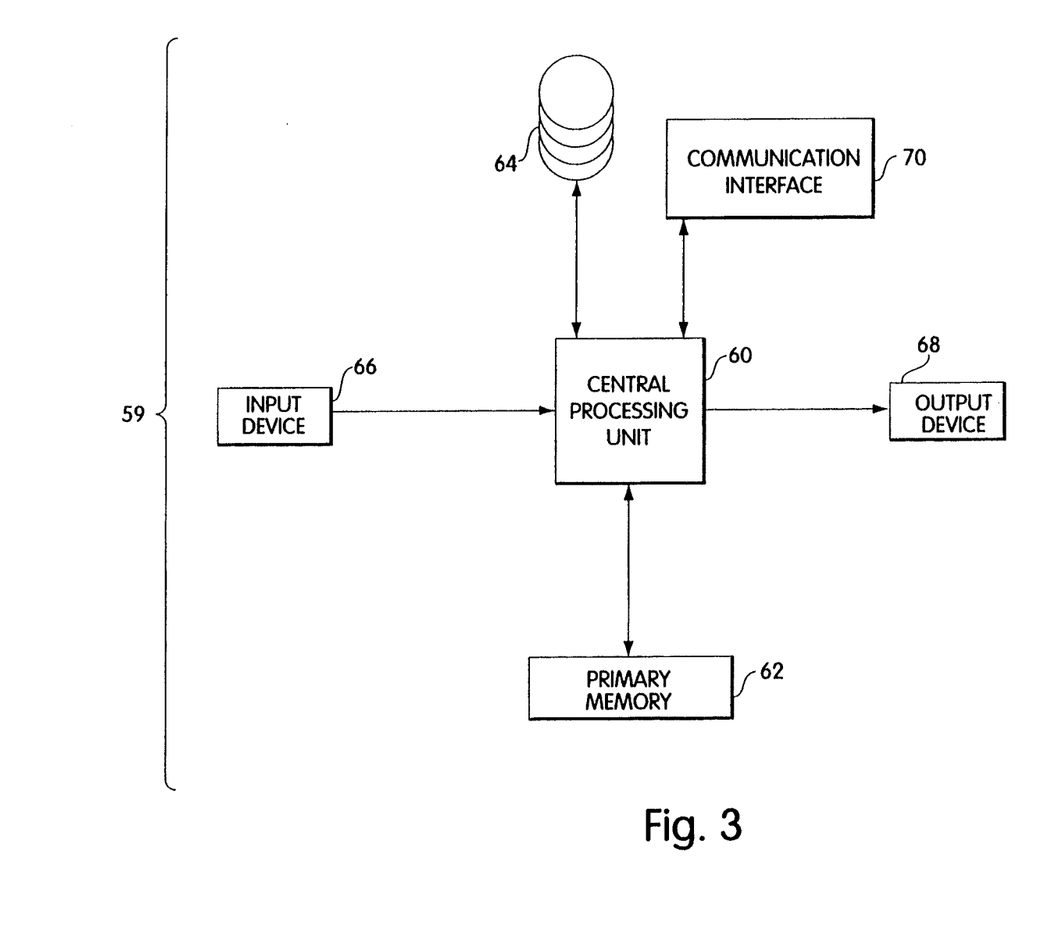
FIG. 3 is a block diagram of a data processing system with which the present invention may be used.

Genetic learning algorithms may be adapted to include the foregoing constraints on selection of trial sets. Genetic learning processes such as these may be applied to processes such as manufacturing processes, database searches and design, in a manner to be described below, by using an appropriate data processing system, such as shown in FIG. 3. The data processing system 59 includes a central processing unit 60 which controls the operation of the data processing system, including manipulation of data, and control of data flow. The data processing system includes a primary memory 62, which is typically volatile, such as a random access memory, and is used for temporarily storing data or application programs to be run by the data processing system. A secondary memory 64 is also used to provide permanent storage of data and application programs. Application programs include steps which are performed by the central processing unit 60 to complete a given process. The central processing unit 60 includes a program known as the operating system which controls data flow and execution of application programs. The data processing system 59 also preferably includes input devices 66 and output devices 68 which provide an interface to human operators. Such input devices 66 include keyboards, a mouse, voice recognition systems, and the like. Output devices 68 include video displays, printers, speech generation units, and the like. The data processing system 59 also may include a communication interface 70, which may include a modem and other appropriate communication application programs. Such a communication interface 70 is useful for accessing remote computer systems. By using such a communication interface, a small computer such as an IBM-PC ® or a compatible machine, or an Apple ® Macintosh ® may be used as the data processing system 59 unless the number and/or size of trial sets is large. Thus, larger computers, such as workstations, mainframes or supercomputers may also be used. Many important problems may require a mainframe-size or supercomputer for database testing or simulation. In general, any programmable general purpose computer or special purpose hardware may be used.

A genetic learning process may be implemented on such a data processing system 59 as an application program. Such an application program may be developed using a number of computer programming languages. The following flowcharts, describing the appropriate steps of the program, will enable a typical computer system designer to develop such an application program. The procedures described therein may be implemented on a computer using a variety programming languages such as C and LISP. The selection of a programming language will depend on the programmer, the system used and the intended application and is not limited to those mentioned.

Figure 4:
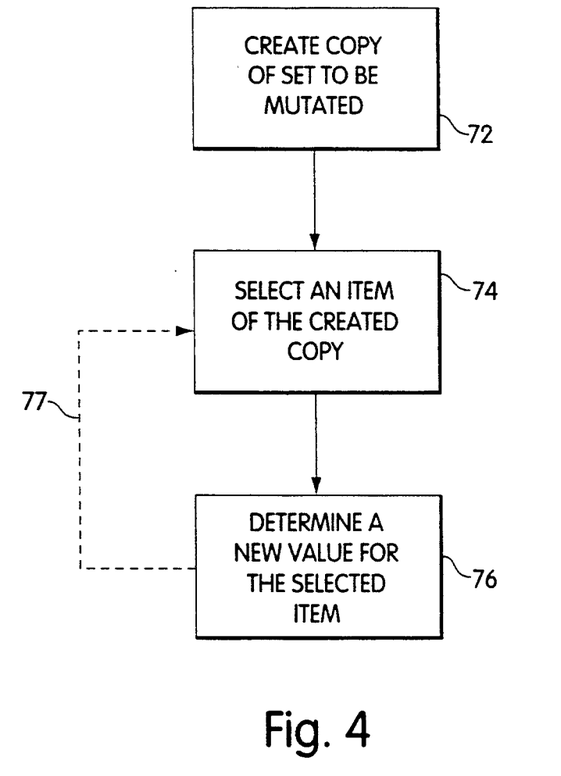
FIG. 4 is a flowchart describing how mutation of a trial set is performed.

To implement a genetic learning process, procedures for perturbing trial sets are required. Two types of such procedures are mutation and crossover as described above. The process of mutation of a trial set is described in further detail in connection with FIG. 4. It is assumed for this process that a trial set to be mutated is provided at a given memory location, either in primary memory 62 or secondary memory 64. The trial set may be represented using a number of different data structures such as arrays or lists. The first step of mutation is creating a copy of the trial set to be mutated, in step 72. This copy should be such that a change to the copy does not change the original. That is, an additional memory location (e.g., in primary memory 62) should be allocated for the copy. An item of the trial set of the created copy is then selected in step 74. This step of selection may be performed by selecting a random number based on the length, or number of items, in the trial set. A new value is then determined in step 76, for the selected item. For items whose possible values have no relation to a numeric range, a new value may be selected by a random selection from the set of possible values. A new value may also be determined by selecting an item from the set of possible values based on the location of the present value within a set. For items whose possible values have a relation to a numeric range, mutation may be based on a function of the present value and a random number within a certain maximum deviation within the numeric range. It is preferable to have a mutation procedure which is generic for all items based on a numeric range. For this purpose the numeric ranges of all possible values may be normalized. Although, in some genetic learning processes, mutation is performed on only one item per mutated trial set, it is possible to mutate a number of items within a trial set by repeating steps 74 and 76 as indicated by the dashed arrow 77. The number of items mutated may be determined probablistically.

Figure 5:
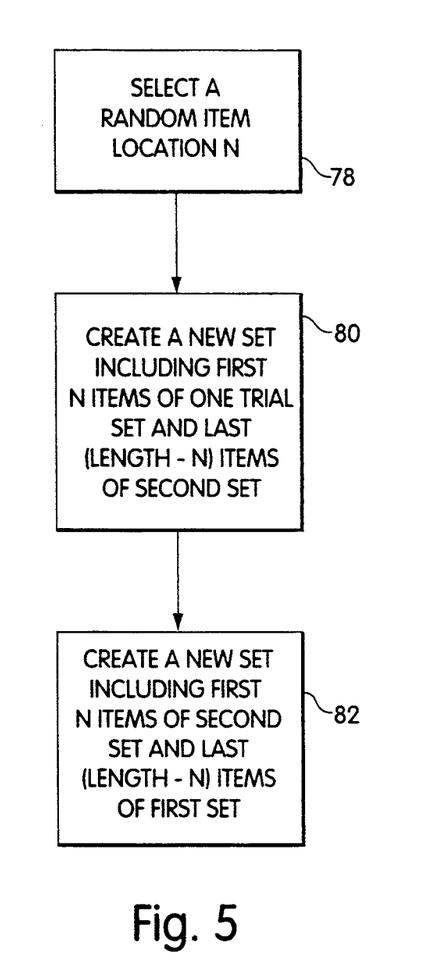
FIG. 5 is a flowchart describing how crossover of two trial sets is performed.

FIG. 5 is a flowchart describing how crossover is completed. It assumes that two trial sets are already provided at a location in memory (either primary memory 62 or secondary memory 64). The first step of crossover is selecting a location at which crossover will be completed (step 78). This step may be implemented by selecting a random number based on the length of the trial set. Step 80, creating a new set, follows. The new set includes, as its first N items, the first N items of one of the trial sets being crossed. Its last items are the last items of the second set which remain after the first N items. Given the length L of a trial set, these items are the last items of the second set. In a similar manner, a second set is created in step 82. This second set includes the first N items of the second set provided for crossover and its last items are the last L-N items of the first set provided for crossover.

Figure 6:
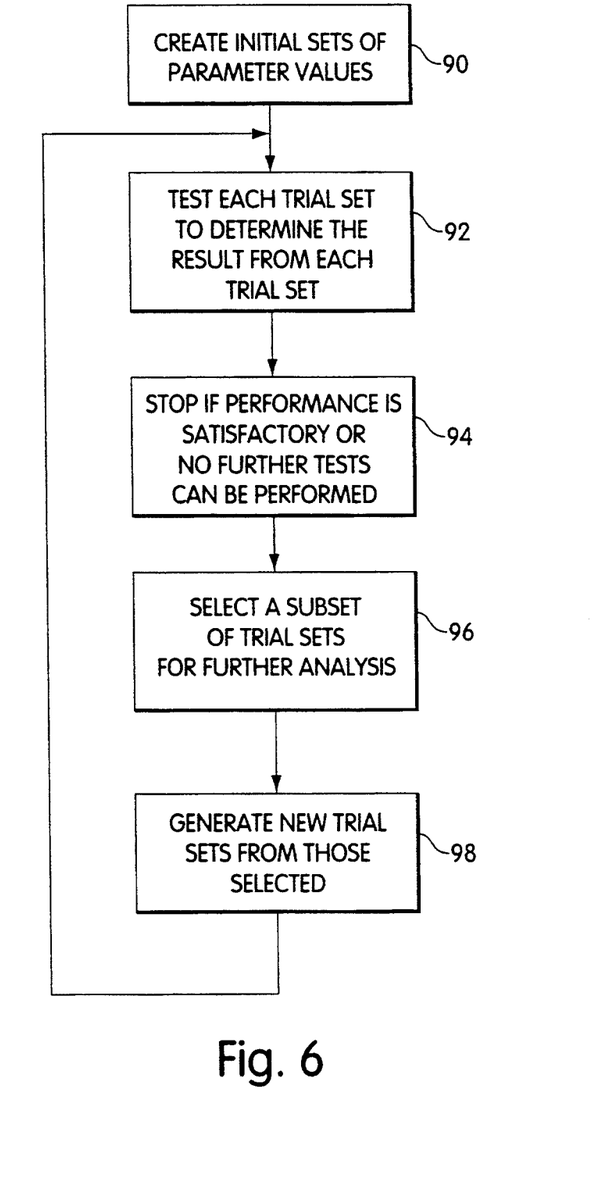
FIG. 6 is a flowchart describing how results from a process may be optimized using a genetic learning process.

The above-described procedures for perturbation may be used in an optimization process as will now be described in connection with FIG. 6. An optimization process begins with the first step 90 of creating initial trial sets of parameter values. These sets may be selected by choosing random values from the allowed range of values for each parameter of a trial set. Alternatively, a person familiar with the process to be optimized, such as an engineer, may specify representative trial sets. Such representative sets may include known local maxima. For each trial set provided, the process is performed to determine a result (step 92). For manufacturing processes, a product may actually be produced, or a simulation of the manufacturing process may be run. In order to save time and effort in the performance of a process, it is typically useful to keep a history of trial sets which have been examined along with their results, so that redundant tests need not be performed. Such a history may be kept as data stored on secondary memory 64. For design processes, such as the design of a hull of a ship or the fuselage of an airplane, the process to be performed may be a test, such as in a wind tunnel. Such tests may also be performed by simulation on a computer.

If suitable results have been obtained, or if no further tests may be performed, this optimization process is terminated in step 94. Otherwise, a subset of the tested trial sets is selected for further analysis. This process of selection is based on the rank of the trial sets as determined on the basis of quality, or quality and diversity, as described in detail above. It is this step which may be considered as an implementation of the idea of "survival of the fittest". The trial sets which "survive" are then perturbed in step 98 to generate additional trial sets. Duplicate trial sets should be eliminated.

The additional trial sets and the surviving trial sets are then evaluated in step 92. These additional sets and surviving sets may be provided to a user via an output device 68 of the computer 59. They may also be provided to another application program running on the computer for controlling a process. This process may be repeated until a satisfactory result is obtained, until no further tests may be performed (step 94), or until the rate of change of improvements to the results obtained is sufficiently small. The generation of additional trial sets in step 98 may be performed using the processes of mutation and crossover described above in connection with FIGS. 4 and 5.

Figure 7:
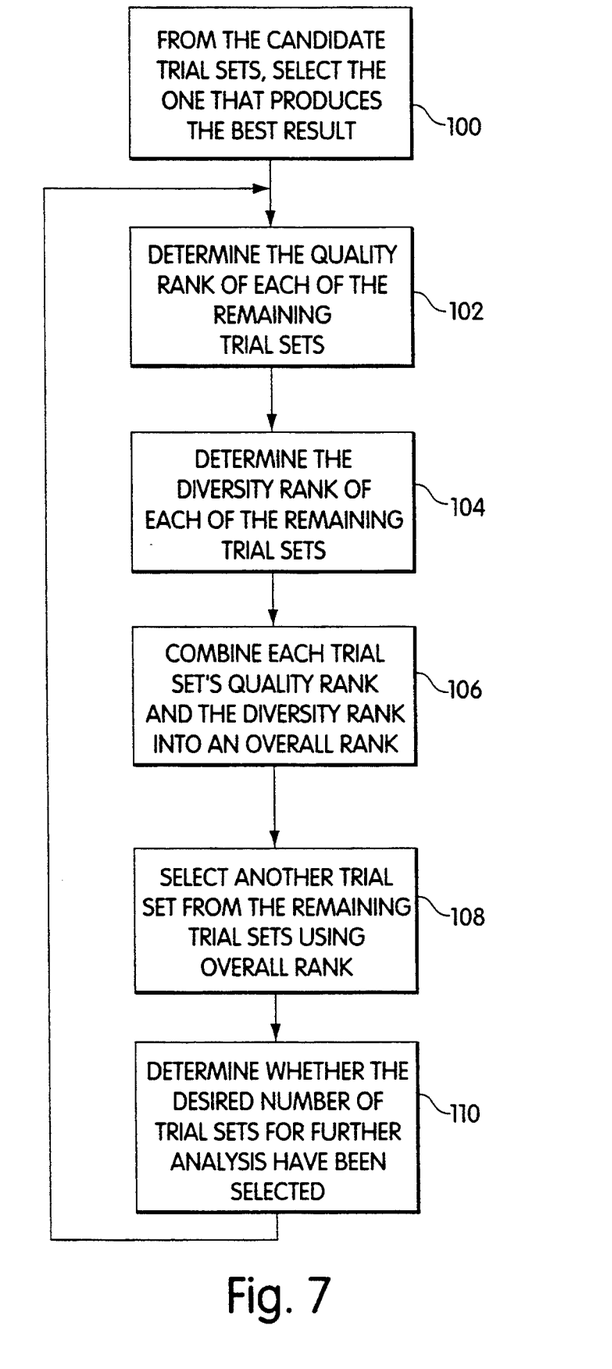
FIG. 7 is a flowchart describing how trial sets may be selected for further analysis.

The process of selecting a subset of trial sets for further analysis (step 96) will be described in further detail in connection with FIG. 7 and Tables II through VII. The process of selection begins with step 100 of selecting the trial set which produces the best result. For the sake of simplicity, as an example, assume that the set represented by ordered pair (5,1) produced the best result, for the sake of the example. The process of selection continues with step 102 of determining the quality rank of each of the remaining trial sets. For example, assuming set (5,1) was selected in step 100, the quality ranking of the remaining trial sets is shown in Table II above. The diversity rank of each of the remaining trial sets is then determined in step 104. For the sake of example, this diversity ranking is shown in Table III. Step 104, though preferable, is optional as one could base the further steps of selection purely on quality rank. If the diversity rank is determined, the quality rank and diversity rank of each trial set is combined into an overall rank (step 106). Refer to Table IV for an example. If more than one trial set has the same combined quality rank and diversity rank, ties may be broken according to either diversity or quality.

Given a quality rank as determined in step 102 or a combined overall rank as determined in step 106, another trial set is selected from the remaining trial sets using the determined rank (step 108). The trial set having the highest rank may be selected or this selection could be performed probablistically according to a rank fitness formula such as equation 1 described above. In the examples described in the tables above, trial set A (1,4) would be selected as it has the highest overall rank. After another trial set is selected in step 108, it is then determined in step 110, whether the desired number of trial sets for further analysis have been selected. The desired number of trial sets may be a fixed number, or may be based on the number of known local maxima. In some cases, the search space is full of local optima or maxima but those local optima tend to increase monotonically toward a global maxima. With such a search space, the number of "survivors" selected by step 108 may be periodically reduced and then allowed to increase again. Such periodic reduction in such a search space tends to eliminate trial sets stuck on low local maxima so they may be used to seek out higher local maxima.

If enough trial sets for further analysis have not been selected, processing continues with a repetition of steps 102 to 110. Tables VI and VII illustrate the result of such repetition with the provided example. After steps 102 through 106 have been repeated on remaining trial sets B-E, the overall rank and fitness of these sets is shown in Table VI. Set E (7,5) now has the highest overall rank, and thus the highest fitness. For comparison, set E (7,5), according to the standard fitness method, would have had a fitness of 0, and would not be selected. In contrast, step 108 of selection of another trial set selects trial set E.

TABLE VI

| Trial Set | Diversity | Diversity Rank | Quality Rank | Overall Rank | Rank/ Diversity Fitness |
|---|---|---|---|---|---|
| B (3, 1) | 0.327 | 4 | 1 | 4 | 0.037 |
| C (1, 2) | 0.309 | 3 | 2 | 3 | 0.074 |
| D (1, 1) | 0.173 | 2 | 3 | 2 | 0.222 |
| E (7, 5) | 0.077 | 1 | 4 | 1 | 0.667 |

Once steps 102–106 are repeated again after the selection of trial set E, trial set D (1,1) has the highest overall rank as shown in Table VII.

TABLE VII

| Trial Set | Diversity | Diversity Rank | Quality Rank | Overall Rank | Rank/ Diversity Fitness |
|---|---|---|---|---|---|
| B (3, 1) | 0.358 | 3 | 1 | 3 | 0.111 |
| C (1, 2) | 0.331 | 2 | 2 | 2 | 0.222 |
| D (1, 1) | 0.190 | 1 | 3 | 1 | 0.667 |

Figure 8:
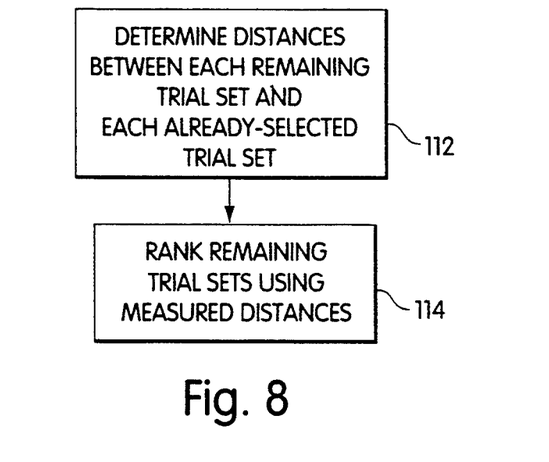
FIG. 8 is a flowchart describing one method for determining a diversity rank.

The diversity rank determined in step 104 of a remaining trial set is determined by the distance between the remaining trial set and all of the selected trial sets. The remaining trial sets are ranked according to this determined distance. This step of determining the diversity rank may be performed in many different ways. Two possibilities will now be described in connection with FIGS. 8 and 9.

One method of determining diversity rank (FIG. 8) includes a step 112 of determining the distances between each remaining trial set and each selected trial set. That is, for each remaining trial set, its distance from each of the selected trial sets is calculated. These distances are then summed. Distance may be determined according to a number of different distance metrics as described above. When a sum is obtained for each of the remaining trial sets, the trial sets are ranked according to these sums (step 114).

Figure 9:
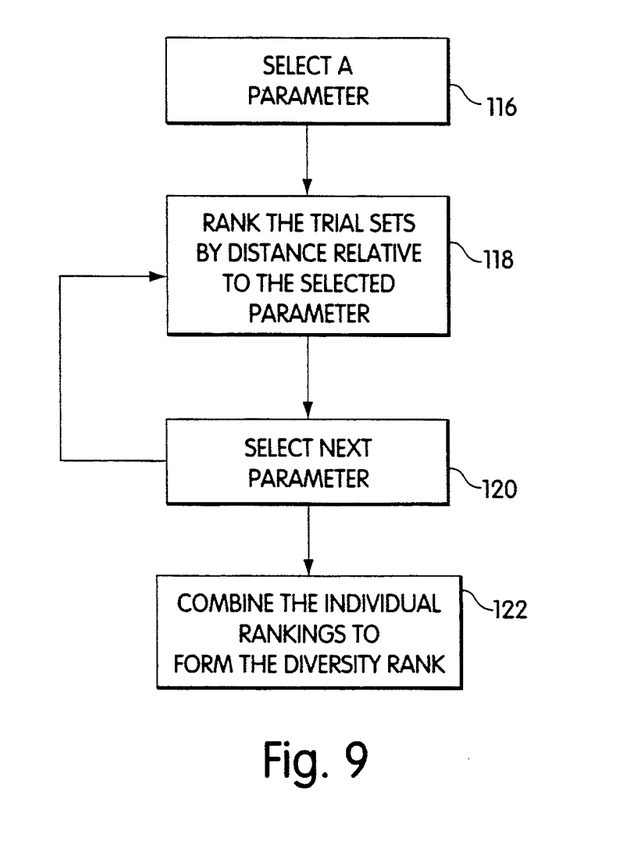
FIG. 9 is a flowchart describing a second method for determining diversity rank.

An alternative method is shown in FIG. 9. This method begins with the selection of a parameter in step 116. The remaining trial sets are ranked by distance relative to the selected parameter. With this distance calculation, it is possible that for a given parameter, a candidate will have no diversity. Care must be taken to select a distance metric which does not cause an error, for example, by a division by zero. The next parameter is then selected in step 120, and steps 118–120 are repeated for all parameters. When a ranking relative to all parameters is obtained for each trial set, the rankings are combined to form an overall diversity rank in step 122. The results of an example are shown in Table VIII below. Note that ties are broken on the basis of quality.

TABLE VIII

| Trial Set | First Parameter | Second Parameter | Rank Sum | Overall Diversity |
|---|---|---|---|---|
| a (1, 4) | 1 | 2 | 3 | 1 |
| b (3, 1) | 2 | 4 | 6 | 5 |
| c (1, 2) | 1 | 3 | 4 | 3 |
| d (1, 1) | 1 | 4 | 5 | 4 |
| e (7, 5) | 2 | 1 | 3 | 2 |

A data processing system implementing the above-described genetic learning process may be used to improve, or optimize, many different specific processes. It is especially useful with database search applications, such as predictions using financial databases, and with manufacturing and design evaluation processes. How these implementations may be realized will now be described.

According to the genetic learning process as described above in connection with FIGS. 3–9, a process is performed to obtain a result for each trial set (step 92, FIG. 6). When this process is a process for manufacturing a product, such as a chemical process, or semiconductor fabrication process, the parameters of a trial set are those controllable factors of the manufacturing process. For example, this may include temperatures, flow rates, proportions of materials used, and the like. The quality of the result may be based on the volume yield of the process, or may be the actual quality of the product, such as its durability or accuracy.

When this process is a database search, a trial set of parameters is typically a database query. With this process, a database is queried with a trial set to obtain a set of items from the database which match the trial set, and a set which do not match the trial set. It is then determined whether the matching and non-matching trial sets satisfy or fail to satisfy a given selection criterion. For example, a database of personal financial information could be searched with a database query which is intended to predict those people who are likely to go bankrupt. The results of this search could then be compared to information which determines whether in fact such individuals have gone bankrupt. Similarly, a trial set could be used to query a database with the intent of predicting whether certain individuals would be likely to buy a certain product. The matching and unmatching trial sets could be subjected to a market test, the results of which determine the quality to be assigned to the trial set. Another database application involves stockmarket prediction, where information concerning a company and its stock price history is stored in a database. A database query, intended to predict that a company will experience large growth, could be used to search the database. A comparison of the matched sets and unmatched sets to actual stock market prices would determine the quality of the trial set as a predictor.

The genetic learning process described above could also be applied to design of products, such as aircraft, ships, or even drugs. This application is similar to a manufacturing process. The performance of a designed product is often determined by a number of variable parameters. For aircraft, for example, speed and fuel consumption are determined by details of the fuselage shape. For ships, hull shape plays a similar role. The process to be performed is using or testing an object. Each trial set corresponds to parameters representing a particular aircraft fuselage or ship hull. The result, the aircraft or ship performance associated with each set of parameter values, could be determined by experimental testing, such as in a wind tunnel or towing tank, or by simulation. With such a process, cost or time limitations may limit the number of trial sets which may actually be evaluated.

Having now described the preferred embodiment of the invention, it should be apparent to those skilled in the art that the foregoing is illustrative only and not limiting, having been presented by way of example only. Numerous other embodiments of the modification thereof are contemplated as falling within the scope of the present invention as defined by the appended claims and equivalents thereto.

What is claimed is:

1. A method for searching for improved results from a process, which process is performed according to a set of parameters, comprising the steps of:
   a. providing at least one trial set of parameters for the process;
   b. performing the process to obtain a result for each trial set for which a result has not been obtained;
   c. selecting at least one trial set from the provided trial sets on the basis of an overall ranking of the trial sets based on a selected criterion, wherein the selected criterion is both quality and diversity; and
   d. perturbing at least one of the selected trial sets to obtain an additional trial set for the process;
   e. repeating step b providing the selected trial sets and the additional trial sets for further analysis.

2. The method of claim 1, wherein the step d of perturbing includes the step of crossing at least one pair of trial sets, to generate a plurality of additional trial sets.

3. The method of claim 2, wherein the step of crossing includes selecting said pair of trial sets on the basis of diversity from the trial sets selected in step c.

4. The method of claim 3, wherein the step of perturbing further includes mutating at least one of the trial sets selected in step c and generated by crossing, to generate at least one additional trial set.

5. The method of claim 1, wherein the step of perturbing includes mutating at least one of the trial sets selected in step c to generate at least one additional trial set.

6. The method of claim 1, wherein after step e, steps c through e are repeated until a selected termination criterion is satisfied.

7. The method of claim 6, wherein the selected termination criterion is based on the rate of change of quality with each new trial set.

8. The method of claim 6, wherein the selected termination criterion is the production of a product of sufficient quality.

9. The method of claim 1, wherein step c of selecting at least one trial set includes the step of selecting any remaining trial set whose result has the highest quality.

10. The method of claim 9, wherein the step c of selecting further includes the steps of:
   f. ranking any remaining trial sets on the basis of quality and of diversity with respect to any selected trial sets; and
   g. selecting any remaining trial set having the highest ranking based on quality and on diversity with respect to any selected trial sets.

11. The method of claim 10, wherein the step c of selecting further includes the step of repeating steps f and g until a sufficient number of trial sets is selected.

12. The method of claim 11, wherein the sufficient number of trial sets selected is the number of known local maxima of the process.

13. The method of claim 10, wherein the step f of ranking on the basis of diversity includes the steps of:
determining the diversity between each trial set and each selected set, and
ranking the trial sets according to the determined diversity.

14. The method of claim 13, wherein the step of determining the diversity between sets includes the step of performing a Euclidean distance calculation.

15. The method of claim 13, wherein the step of determining the diversity between sets includes the step of performing a Hamming distance calculation.

16. The method of claim 10, wherein the step f of ranking on the basis of diversity comprises the steps of:
for each parameter, determining the diversity between the parameter of each trial set and the parameter of each selected set;
for each parameter, ranking the trial sets according to the determined diversity; and
combining the rankings obtained for each parameter for each trial set to obtain an overall diversity ranking.

17. The method of claim 16, wherein the step of determining the diversity between sets includes the step of performing a Euclidean distance calculation.

18. The method of claim 16, wherein the step of determining the diversity between sets includes the step of performing a Hamming distance calculation.

19. The method of claim 1, wherein the step c of selecting at least one trial set includes assigning probabilities to said trial sets according to a function of overall ranking, and selecting probablistically according to the assigned probabilities.

20. The method of claim 19, wherein the step of assigning probabilities to said trial sets includes the steps of:
assigning a probability P to the trial set ranked first;
assigning a probability $f_i$ to each remaining trial set according to the function $f_i=(1-f_{i-1})P$, where i represents the rank of the trial set.

21. The method of claim 1 wherein the process is a manufacturing process for making a product, wherein the parameters are controllable factors of the manufacturing process and wherein the result of the process performed according to a trial set of parameters is the product.

22. The method of claim 1, wherein the process is a database search, wherein the parameters are characteristics of an item stored in the database on which a search may be performed and wherein the result of the process performed according to a trial set of parameters is
an indication of a set of items in the database which both match the trial set; and
an indication of a set of items in the database which both do not match the trial set.

23. The method of claim 22 wherein a trial set of parameters is intended to predict that matching sets satisfy a predetermined criterion and non-matching sets do not satisfy the predetermined criterion.

24. The method of claim 1, wherein the process is a process of using a product having a design specification wherein the parameters are variable factors of the product design specification, and wherein the result of the process performed according to the process is a performance of the product.

25. A data processing system for searching for improved results from a process, which process is controlled by a set of parameters, the system comprising:
a memory for storing data;
an input device for receiving an indication of at least one trial set of parameters and for storing the trial set in the memory;
a central processing unit for generating additional trial sets and for selecting trials sets for analysis, and including means for selecting at leastzone trial set from the provided trial sets on the basis of an overall ranking of the trial sets based on a selected criterion, wherein the selected criterion is both quality and diversity, and means for perturbing at least one of the selected trial sets to obtain an additional trial set for the process; and
means for providing an indication of trial sets for which the process is to be performed to obtain a result.

26. The data processing system of claim 25, wherein the means for perturbing includes means for crossing at least one pair of trial sets, to generate a plurality of additional trial sets.

27. The data processing system of claim 26, wherein the means for crossing includes means for selecting said pair of trial sets on the basis of diversity from the trial sets selected by the means for selecting.

28. The data processing system of claim 27, wherein the means for perturbing further includes means for mutating at least one of the trial sets selected by the means for selecting and generated by the means for crossing, to generate at least one additional trial set.

29. The data processing system of claim 25, wherein the means for perturbing includes means for mutating at least one of the trial sets selected by the means for selecting to generate at least one additional trial set.

30. The data processing system of claim 25, further comprising means responsive to an indication that results have been obtained, for the process for operating said means for selecting, said means for perturbing, and said means for providing until a selected termination criterion is satisfied.

31. The data processing system of claim 30, wherein the selected termination criterion is based on the rate of change of quality with each new trial set.

32. The data processing system of claim 30, wherein the selected termination criterion is the production of a product of sufficient quality.

33. The method of claim 25, wherein the means for selecting at least one trial set includes means for selecting any remaining trial set whose result has the highest quality.

34. The data processing system of claim 33, wherein the means for selecting further includes:
means for ranking any remaining trial sets on the basis of quality and of diversity with respect to any selected trial sets; and
means for selecting any remaining trial set having the highest ranking based on quality and on diversity with respect to any selected trial sets.

35. The data processing system of claim 34, wherein the means for selecting further includes means for operating the means for ranking and the means for selecting any remaining trial sets until a sufficient number of trial sets is selected.

36. The data processing system of claim 35, wherein the sufficient number of trial sets selected is the number of known local maxima of the process.

37. The data processing system of claim 34, wherein the means for ranking on the basis of diversity includes:
- means for determining the diversity between each trial set and each selected set, and
- means for ranking the trial sets according to the determined diversity.

38. The data processing system of claim 37, wherein the means for determining the diversity between sets includes means for performing a Euclidean distance calculation.

39. The data processing system of claim 37, wherein the means for determining the diversity between sets includes means for performing a Hamming distance calculation.

40. The data processing system of claim 34, wherein the means for ranking on the basis of diversity comprises:
- means for determining, for each parameter, the diversity between the parameter of each trial set and the parameter of each selected set;
- means for ranking, for each parameter, the trial sets according to the determined diversity; and
- means for combining the rankings obtained for each parameter for each trial set to obtain an overall diversity ranking.

41. The data processing system of claim 40, wherein the means for determining the diversity between sets includes means for performing a Euclidean distance calculation.

42. The data processing system of claim 40, wherein the means for determining the diversity between sets includes means for performing a Hamming distance calculation.

43. The data processing system of claim 25, wherein the means for selecting at least one trial set includes means for assigning probabilities to said trial sets according to a function of overall ranking, and means for selecting probablistically according to the assigned probabilities.

44. The data processing system of claim 43, wherein the means for assigning probabilities to said trial sets includes:
- means for assigning a probability P to the trial set ranked first;
- means for assigning a probability $f_i$ to each remaining trial set according to the function $f_i=(1-f_{i-1})P$, where i represents the rank of the trial set.

45. The data processing system of claim 25, wherein the process is a manufacturing process for making a product, wherein the parameters are controllable factors of the manufacturing process and wherein the result of the process performed according to a trial set of parameters is the product.

46. The data processing system of claim 25, wherein the process is a database search, wherein the parameters are characteristics of an item stored in the database on which a search may be performed and wherein the result of the process performed according to a trial set of parameters is
- an indication of a set of items in the database which both match the trial set; and
- an indication of a set of items in the database which both do not match the trial set.

47. The data processing system of claim 46 wherein a trial set of parameters is intended to predict that matching sets satisfy a predetermined criterion and nonmatching sets do not satisfy the predetermined criterion.

48. The data processing system of claim 47, wherein the process is a process of using a product having a design specification wherein the parameters are variable factors of the product design specification, and wherein the result of the process performed according to the process is a performance of the product.

49. A method for searching for improved results from a process, which process is performed according to a set of parameters, comprising the steps of:
- a. providing at least one trial set of parameters for the process;
- b. performing the process to obtain a result for each trial set for which a result has not been obtained;
- c. ranking the trial sets according to the results obtained for the trial sets and a selected criterion, each trial set thereby having a rank, wherein the selection criterion is both quality and diversity;
- d. selecting at least one trial set from the provided trial sets according to the rank of the trial set; and
- e. perturbing at least one of the selected trial sets to obtain an additional trial set for the process;
- f. repeating step b providing the selected trial sets and the additional trial sets for further analysis.

50. The method of claim 49, wherein the selection criterion is diversity.

51. The method of claim 49, wherein the step d of selecting at least one trial set comprises the steps of:
- assigning a probability to each of said trial sets according to a function of the rank of the trial set, and
- selecting said at least one trial set probablistically according to the assigned probabilities.

52. A data processing system for searching for improved results from a process, which process is controlled by a set of parameters, the system comprising:
- a memory for storing data including an indication of at least one trial set of parameters;
- a central processing unit for generating additional trial sets and for selecting trial sets for analysis, and including:
  - means for ranking the trial sets according to results obtained for the trial sets and a selected criterion, each trial set hereby having a rank, wherein the selected criterion is both quality and diversity;
  - means for selecting at least one trial set from the provided trial sets on according to the rank of the trial set, and
  - means for perturbing at least one of the selected trial sets to obtain an additional trial set for the process.

53. The data processing system of claim 52, wherein the selected criterion is diversity.

54. The data processing system of claim 52, wherein the means for selecting at least one trial set comprises:
- means for assigning a probability to each of said trial sets according to a function of the rank of the trial set, and
- means for selecting said at least one trial set probablistically according to the assigned probabilities.

* * * * *